United States Patent
Li et al.

(10) Patent No.: US 10,686,547 B1
(45) Date of Patent: Jun. 16, 2020

(54) HYBRID DIGITAL MULTI-BAND OPTICAL RECEIVER AND TRANSMITTER

(71) Applicant: HUAWEI TECHNOLOGIES CO., LTD., Shenzhen, Guangdong (CN)

(72) Inventors: Chuandong Li, Ottawa (CA); Zhuhong Zhang, Ottawa (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/295,126

(22) Filed: Mar. 7, 2019

(51) Int. Cl.
*H04J 14/02* (2006.01)
*H04L 12/801* (2013.01)

(52) U.S. Cl.
CPC .......... *H04J 14/0298* (2013.01); *H04L 47/10* (2013.01)

(58) Field of Classification Search
CPC combination set(s) only.
See application file for complete search history.

(56) References Cited

U.S. PATENT DOCUMENTS

| | | | |
|---|---|---|---|
| 2012/0076507 A1* | 3/2012 | Roberts | H04B 10/613 398/205 |
| 2013/0170840 A1 | 7/2013 | Chang et al. | |
| 2013/0209097 A1* | 8/2013 | Vo | G02B 6/4215 398/38 |
| 2014/0169501 A1* | 6/2014 | Nazarathy | H03H 17/0266 375/316 |
| 2014/0205286 A1* | 7/2014 | Ji | H04B 10/40 398/45 |
| 2014/0341594 A1* | 11/2014 | Olsson | H04B 10/613 398/203 |
| 2016/0269122 A1* | 9/2016 | Yu | H04B 10/541 |
| 2017/0041080 A1* | 2/2017 | Tanaka | H04B 10/61 |
| 2017/0250758 A1* | 8/2017 | Kikuchi | H04B 10/2513 |
| 2017/0317759 A1* | 11/2017 | Agazzi | H04L 7/0075 |
| 2018/0091288 A1 | 3/2018 | Zamani et al. | |

FOREIGN PATENT DOCUMENTS

| | | |
|---|---|---|
| WO | 2011113097 A2 | 9/2011 |
| WO | 2018064815 A1 | 4/2018 |

OTHER PUBLICATIONS

PCT International Search Report & Written Opinion dated Feb. 27, 2020 for International Application No. PCT/CN2019/125867; filed Dec. 17, 2019; 9 pp.

\* cited by examiner

*Primary Examiner* — Omar S Ismail

(57) ABSTRACT

A method includes distributing payload data among a master sub-band and a plurality of slave sub-bands. The master sub-band and the plurality of slave sub-bands collectively extend over an allocated frequency spectrum; the master sub-band and the plurality of slave sub-bands are associated with different carrier frequencies; and the master sub-band has a center frequency that corresponds to a center frequency of the allocated frequency spectrum. The method includes generating modulated data for the master sub-band and the plurality of slave sub-bands based on the distributed payload data; and transmitting an optical signal to an optical medium representing the modulated data.

19 Claims, 5 Drawing Sheets

HYBRID DIGITAL MULTI-BAND OPTICAL RECEIVER AND TRANSMITTER

BACKGROUND

Data may be communicated over an optical fiber in one or multiple bands. In this manner, for single band optical communication, the allocated spectrum contains content that is produced by the modulation of payload data with a single optical carrier. For a multiple carrier-based communication (or "multi-band" communication), the allocated spectrum is divided into multiple parts of the spectrum called "sub-bands." Each sub-band is associated with an optical carrier and contains content produced by the modulation of payload data with the optical carrier; and adjacent sub-bands are separated by null points in the allocated spectrum.

SUMMARY

Although digital multi-band optical communication has the advantage of allowing more information to be communicated over an optical fiber (as compared to single band optical communication), there may be challenges in designing multi-band optical receivers and transmitters. For example, one challenge may be designing the multi-band optical receivers and transmitters to be backward compatible, as a large number of single carrier networks are still in use. As compared to a single carrier optical receiver, a multi-band optical receiver makes precise adjustments to the received optical signal for purposes of aligning the receiver with a center null point of the received optical signal. Misalignment of the receiver with respect to the center null point may result in all of the sub-bands being misaligned.

In accordance with example implementations that are described herein, a hybrid digital multi-band is used for the communication of data over an optical fiber using a plurality of carriers. More specifically, in accordance with example implementations, the hybrid digital multi-band spans across an allocated spectrum; and the hybrid digital multi-band includes a single master sub-band, which is located in the center of the allocated spectrum and slave sub-bands that are located on either side of the center master sub-band. In accordance with example implementations, the bandwidth of the master sub-band may be as wide as a single band in a legacy single carrier system and may be significantly wider than each of the slave sub-bands.

Due to this approach, for purposes of single carrier backward compatibility (i.e., when hybrid digital multi-band receivers and transmitters are to work with a single carrier optical system), the receiver may use the master sub-band in conjunction with a coding and modulation scheme that is used for a legacy single carrier system. When the optical system may tolerate a wider spectrum that accommodates multiple sub-bands, the slave sub-bands may be used, and the bandwidth and number of the slave sub-bands may be adjusted to optimize performance and system capacity. Unlike traditional multi-band optical communications, the master sub-band of the hybrid multi-band does not have a null point in the center of the allocated spectrum, which increases the capacity for optical communications and avoids issues with aligning the receiver to the center null point of the received optical signal. Moreover, in accordance with example implementations, the modulation and coding information for the hybrid multi-band may be carried by a control signal that is carried in the content of the master sub-band. Because the control information is carried in the master band, which is centralized in the allocated spectrum, the optical communication system may be switched hitless based on the control signal.

According to an aspect of the present disclosure, there is provided a method that includes distributing payload data among a master sub-band and a plurality of slave sub-bands. The master sub-band and the plurality of slave sub-bands collectively extend over an allocated frequency spectrum; the master sub-band and the plurality of slave sub-bands are associated with different carrier frequencies; and the master sub-band has a center frequency that corresponds to a center frequency of the allocated frequency spectrum. The method includes generating modulated data for the master sub-band and the plurality of slave sub-bands based on the distributed payload data; and transmitting an optical signal to an optical medium representing the modulated data.

According to another aspect of the present disclosure, there is provided an optical receiver apparatus that includes a tunable local oscillator (LO) laser; a coherent optical receiver; a first processor; and a second processor. The coherent optical receiver is to be optically coupled to the LO laser, be optically coupled to an optical fiber to receive an optical signal from an optical fiber, and provide a second signal. The optical signal includes a master sub-band and a plurality of slave sub-bands; the master sub-band and the plurality of slave sub-bands collectively extend over an allocated frequency spectrum; the master sub-band and the plurality of slave sub-bands are associated with different carrier frequencies; and the master sub-band has a center frequency to correspond to a center frequency of the allocated frequency spectrum. The first processor determines a phase adjustment for the LO laser based on information contained within a master sub-band of the optical signal to cause a plurality of slave sub-bands of the second signal that is provided by the coherent optical receiver to converge with the master sub-band of the optical signal. The second processor, based on the phase adjustment determined from the information contained within the master sub-band, recovers data from the plurality of slave sub-bands of the second signal.

According to another aspect of the present disclosure, an optical transmitter apparatus includes a first processor; a second processor; a demultiplexor; and a multiplexor. The first processor is associated with a master sub-band to modulate a master carrier frequency that is associated with the master sub-band; and the second processor is associated with a plurality of slave sub-bands to modulate slave carrier frequencies associated with the slave sub-band from data. The master sub-band and the plurality of slave sub-bands collectively extend over an allocated frequency spectrum, and the master sub-band has a center frequency that corresponds to a center frequency of the allocated frequency spectrum. The demultiplexor distributes payload data to the first processor and the second processor; and the multiplexor combines outputs of the first and second processors to provide an optical signal to an optical fiber representing the payload data.

In any of the preceding aspects, controlled data of the payload data is generated to control a feature that is associated with the master sub-band and the plurality of slave sub-bands. Distributing the payload data includes designating the control data to appear in the master sub-band.

In any of the preceding aspects, generating the data to control the type of modulation includes generating first fault data to set a default type of modulation that is associated with the master sub-band and the plurality of slave sub-bands and subsequently generating second data to set a different type of modulation associated with the master sub-band and the slave sub-bands.

In any of the preceding aspects, the first master sub-band is wider than each of the slave sub-bands.

In any of the preceding aspects, a first number of the slave sub-bands extend in the allocated frequency spectrum above the master sub-band, a second number of the slave sub-bands extend in the allocated frequency spectrum below the master sub-band, and the first and second numbers are equal.

In any of the preceding aspects, the optical receiver apparatus further includes an analog-to-digital converter (ADC) to provide a digital signal representing the second signal corresponding to the master sub-band of the optical signal; and a voltage controlled oscillator (VCO) to provide a clock signal to the ADC. The first processor controls the VCO based on information that is contained within the master sub-band of the optical signal.

In any of the preceding aspects, the first processor controls the VCO based on a timing derived from symbols represented by the information contained within the master sub-band of the optical signal.

In any of the preceding aspects, the first processor includes a demodulation demapper to perform modulation symbol demapping associated with symbols represented by information in the master sub-band of the optical signal; and the second processor includes a plurality of demodulation mappers to demap modulation symbols associated with the slave sub-bands.

In any of the preceding aspects, the first processor includes a decoder to decode data that is associated with the master sub-band of the optical signal; and the second processor includes a plurality of decoders to decode information that is associated with the slave sub-bands of the optical signal.

In any of the preceding aspects, the decoder of the first processor is jointly coupled to the plurality of decoders of the second processor.

In any of the preceding aspects, the optical receiver apparatus includes a digital pre-processing engine to compensate for at least one of a time skew, a quadrature error, or a frequency offset associated with the master sub-band and the plurality of slave sub-bands of the optical signal.

In any of the preceding aspects, the first processor determines a type of demodulation and a plurality of types of demodulation based on information that is contained within the master sub-band of the optical signal, and applies the determined type of demodulation to the master sub-band and the plurality of slave sub-bands of the optical signal.

In any of the preceding aspects, the first processor starts the second processor in response to the master sub-band of the second signal converging with the master sub-band of the optical signal.

In any of the preceding aspects, the allocated frequency spectrum includes nulls between a first slave sub-band and a second null between a second slave sub-band and the master sub-band.

DETAILED DESCRIPTION

Figure 1:
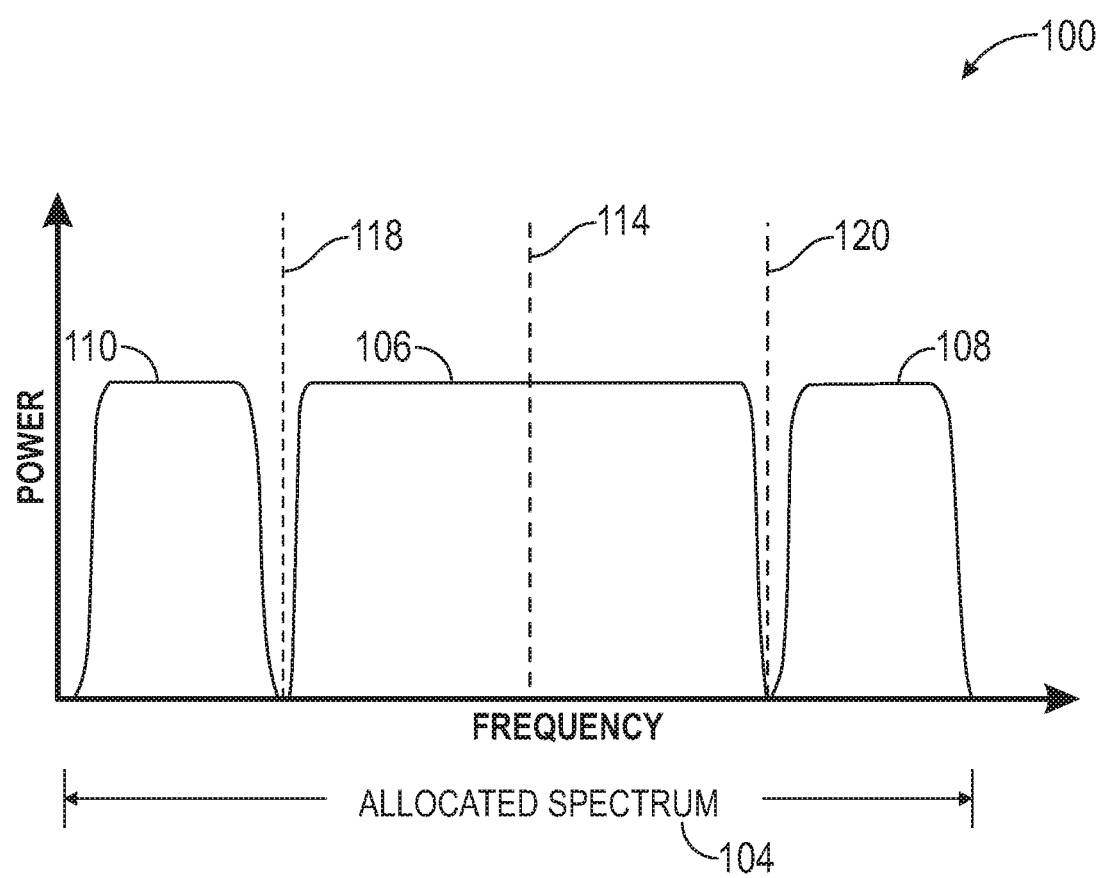
FIG. 1 is an illustration of a power spectral density used for hybrid digital multi-band optical communication according to an example implementation.

Referring to FIG. 1, in accordance with example implementations that are described herein, an optical transmitter and an optical receiver are constructed to communicate over an optical medium, such as an optical fiber, using hybrid digital multi-band optical communication. More specifically, FIG. 1 depicts, in accordance with example implementations, a power spectral density 100 of an allocated spectrum 104 in which hybrid digital multi-band optical communication is used. In general, the power spectral density 100 includes a central master sub-band 106 (having a central wavelength disposed at a central wavelength 114 of the allocated spectrum 104) and peripheral slave sub-bands that are disposed on either side of the master sub-band 106.

Depending on the particular implementation, the optical transmitter and receiver may communicate using a single master sub-band 106 and a selectable number of slave sub-bands, such as zero (for legacy single carrier backward compatibility), two (as depicted in FIG. 1), four, and so forth, depending on the number of carriers that are used in communications in the allocated spectrum 104. For the example spectral density 100 that is illustrated in FIG. 1, the allocated spectrum 104 is divided into the central master sub-band 106 and two adjacent slave sub-bands: a lower frequency slave sub-band 110 (called a "lower sub-band" herein); and a higher frequency sub-band 108 (called a "higher sub-band" herein). As also depicted in FIG. 1, null points separate the sub-bands: a null point 118 separates the master sub-band 106 and the lower slave sub-band 110; and a null point 120 separates the master sub-band 106 and the upper slave band 108.

In addition to being centered at the central wavelength 114 for the allocated spectrum 104, the master sub-band may be further distinguished from the slave sub-bands by its relative width. In this manner, in accordance with example implementations, the bandwidth of the master sub-band 106 may be as wide as the bandwidth of the allocated spectrum for a single carrier system and, as illustrated in FIG. 1, may be significantly wider than either slave sub-band 108 or 110 (may be two to three times wider that the slave sub-band, as an example).

Although receivers and transmitters are described herein that communicate data using multiple carriers over the master and slave sub-bands, for purpose of backward compatibility with a single carrier network, the receivers and transmitters may be designed to not use the slave sub-bands and use the master sub-band 106 for the single carrier communications. However, when the network allows multi-band communications, the optical receiver and transmitter may be configured with parameters for multi-band optical communication, such as parameters specifying the number and width of the slave sub-bands to optimize performance and system capacity.

In general, the master sub-band 106 contains control content that specifies the modulation and coding of content for the master sub-band and the slave sub-bands. More specifically, in accordance with example implementations, the master sub-band 106 may contain such control content as a specifically designated control string that carries information about the modulation type and coding to be used in the master sub-band and slave sub-bands. In this manner, the actual type of modulation (QPSK, QAM8, QAM16, and so forth) that is used for optical communications between the receiver and the transmitter may not be pre-programmed, or pre-configured. Rather, in accordance with example implementations, the optical receiver may accommodate a wide variety of different modulation types, so that a given optical receiver may be initialized, on start up, using a default demodulation, and based on information that is contained in a control string that is communicated over the master sub-band, the optical receiver may identify another modulation type to be used in the optical communications and adjust the demodulation that is applied by the receiver accordingly. It is noted that because the master sub-band 106 is centered in the allocated spectrum 104, challenges pertaining to aligning the receiver to a null point of the sub-band are avoided and allow for a more robust way to communicate control information to the receiver and avoid misalignment issues.

Figure 2:
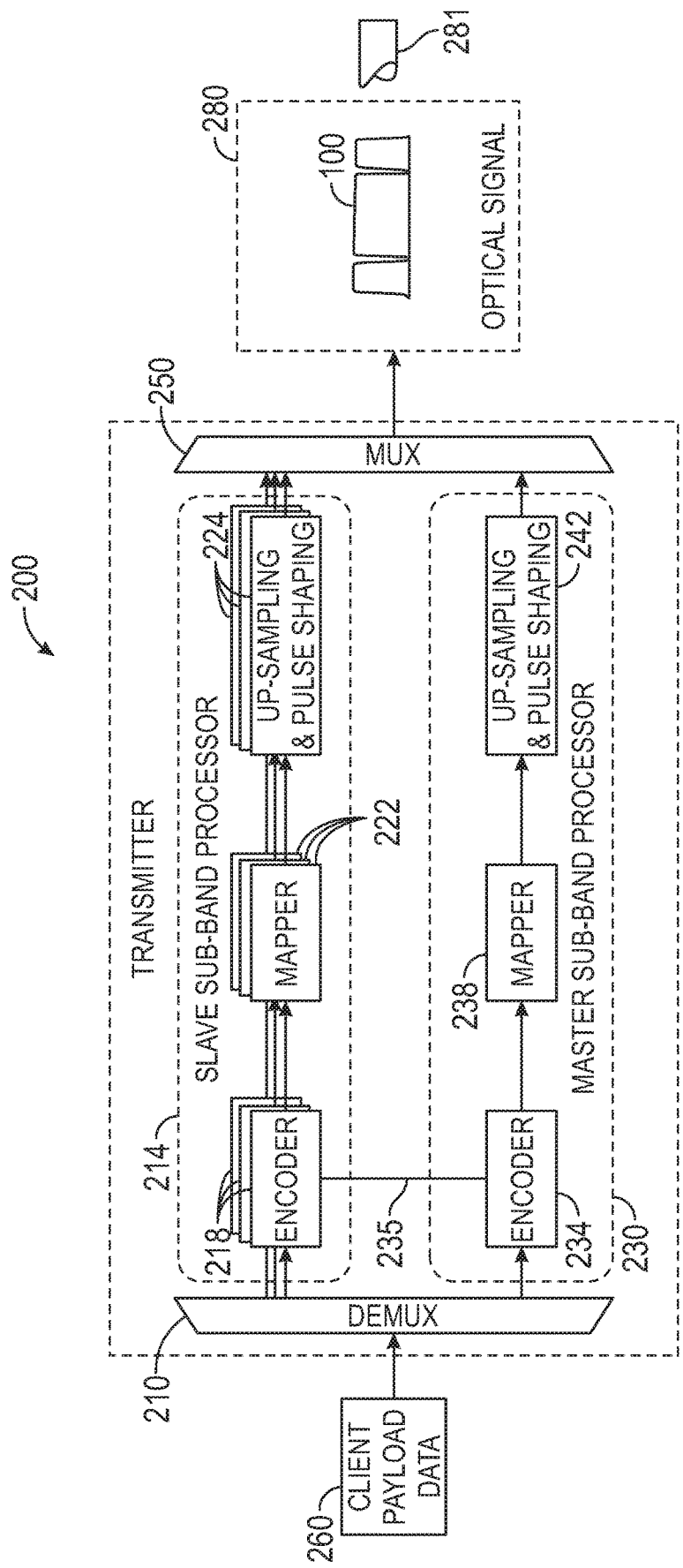
FIG. 2 is a schematic diagram of a hybrid digital multi-band optical transmitter according to an example implementation.

FIG. 2 depicts a schematic diagram 200 of a hybrid digital multi-band transmitter 200 in accordance with example implementations. For this example implementation, the transmitter 200 receives client payload data 260 and produces a corresponding optical signal 280 (provided to an optical fiber 281), which has a corresponding hybrid digital multi-band spectral density 100, as illustrated, for example, in connection with FIG. 1.

In general, the transmitter 200 includes a master sub-band processor 230 (a digital signal processor (DSP), for example); and a slave sub-band processor 214 (another DSP, for example). The transmitter 200 includes a demultiplexor 210, which, according to a predefined configuration, distributes the client payload data 260 among the master and slave sub-bands. As an example, the demultiplexor 210 may be configured to route content for a master channel, including control information (content representing a coding and modulation type, as an example) to the master sub-band processor 230 and route content for slave channels to the slave sub-band processor 214.

In accordance with example implementations, the master sub-band processor 230 includes an encoder 234, which applies an encoding to the received data for the master sub-band channel, depending on the particular modulation type. For example, a 16-QAM modulation type may be used in which four bits are mapped to each symbol, and the encoder 234 encodes the client payload data for the master sub-band channel accordingly. This encoded data, in turn, is provided to a modulation symbol mapper 238 of the master sub-band processor 230, which maps the encoded bits to the appropriate modulation symbols. An up-sampling and pulse shaping component 242 of the master sub-band processor 230 upsamples and performs pulse shaping to produce a corresponding signal representing the content for the master sub-band channel.

As also depicted in FIG. 2, the slave sub-band processor 214 may include multiple encoders 218, where each encoder 218 is associated with a particular slave sub-band channel and encodes the bits, depending on the particular modulation type to be used (i.e., the same modulation type used for the master sub-band channel). An associated modulation mapper 222 maps the encoded bits to the modulation symbols; and up-sampling and pulse shaping components 224 perform the corresponding up-sampling and shaping of the pulses to produce corresponding optical signals for the corresponding slave sub-bands. A multiplexor 250 of the transmitter 200 combines the optical components of the master and slave sub-band channels to provide the composite optical signal 280 that is provided to the optical fiber 281.

Figure 3:
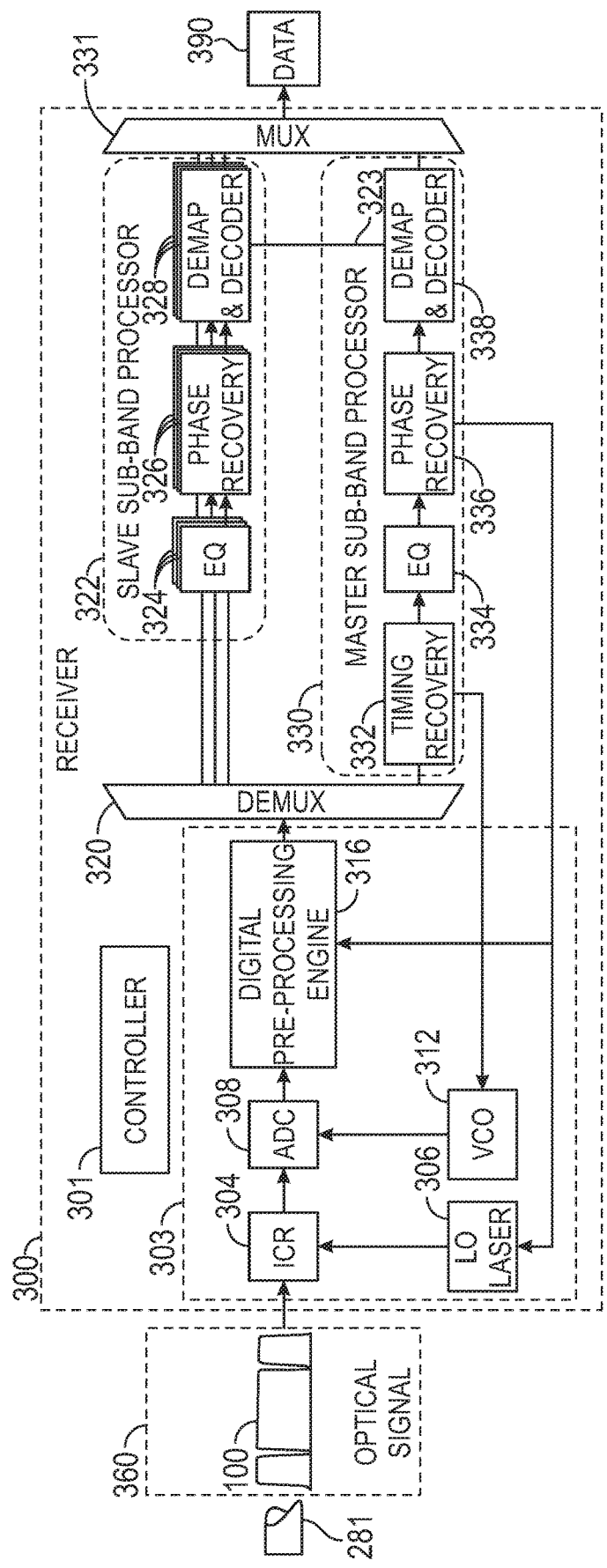
FIG. 3 is a schematic diagram of a hybrid digital multi-band optical receiver according to an example implementation.

Referring to FIG. 3, in accordance with example implementations, a hybrid digital multi-band optical receiver 300 includes front end processing components 303, which include an integrated coherent receiver 304, a local oscillator (LO) laser 306, and an analog-to-digital converter (ADC) 308, a voltage controlled oscillator 312 and a digital pre-processing engine 316. The integrated coherent receiver 304 receives an optical signal 360 from the optical fiber 281. The integrated coherent receiver 304 mixes the optical signal 360 with a laser signal that is produced by the LO laser 306 to produce an electrical signal at the output of the integrated coherent receiver 304, which represents the mixed optical signal. The pre-processing components 303 further include a sample and hold circuit (not shown) that samples and holds the electrical signal that is provided by the integrated coherent receiver 304; and the ADC 308, which is clocked by a clock signal that is provided by the VCO 312, converts the output of the sample and hold circuit into a digital signal that represent the digital version of the electrical signal that is provided by the integrated coherent receiver 304.

The digital pre-processing engine 316, which may be, for example, a DSP, in accordance with example implementations, pre-processes the digital signal that is provided by the ADC 308 for purposes of removing impairments, such as time skew, quadrature error, frequency offset, and so forth. As depicted in FIG. 3, the output of the digital pre-processing engine 316 is provided to the input of a demultiplexor 320, which provides the signal from pre-processing engine 316 to slave and master sub-band channels.

In accordance with example implementations, the receiver 300 includes a master sub-band processor 330 that performs processing of the content of the signal 360 pertaining to the master sub-band such that the processed content is provided to an input of a multiplexor 331 and represents the demodulated content for the master sub-band.

The receiver 300 further includes a slave sub-band processor 322, which processes the contents for associated slave sub-band channels and provides the demodulated contents to corresponding inputs of the multiplexor 331. The multiplexor 331 combines the contents for the slave sub-bands and master sub-bands to provide data 390 (at the output of the multiplexer 331), which represents the content received from the optical fiber 281.

In accordance with example implementations, the master sub-band processor 330 includes a timing recovery engine 332, an equalization engine 334, a phase recovery engine 336 and a demapping and decoding engine 338. The phase recovery engine 336 performs a carrier phase recovery algorithm to recover the LO frequency offset (LOFO). In general, a relatively large LOFO may misalign a particular sub-band in the wrong sub-band bin, partially to completely, depending on the bin with the sub-band and the LOFO, which may significantly impact performance of the receiver. However, due to the relatively large master sub-band and the center wavelength of the master sub-band coinciding with the central wavelength of the allocated spectrum, these problems may be avoided and allow the phase recovery engine 336 to precisely measure the LOFO. As depicted in FIG. 3, the phase recovery engine 336 uses the measured LOFO to provide a signal to control the LO laser 306. Moreover, as also depicted in FIG. 3, in accordance with example implementations, the phase recovery engine 336 may provide a signal, based on the LOFO, to control a frequency shift algorithm that is applied by the digital pre-processing engine 316.

The timing recovery engine 332 of the master sub-band processor 330 controls the phase of the clock signal used to clock the ADC 308 by providing a control signal to the VCO 312. The demapper and decoder engine 338, as its name implies, demaps the modulation symbols, i.e., maps the symbols to encoded data and decodes the encoded data to produce the demodulated and decoded data that is provided to the input of the multiplexor 331 for the master sub-band.

In accordance with example implementations, the slave sub-band processor 332 includes equalization engines 324 for each of the slave sub-band channels as well as phase recovery engines 326 for each of the slave sub-bands and demapping and decoding engines 328 for each of the slave sub-band channels. The demapping and decoding engines 328 provide respective outputs to inputs of the multiplexor 331 representing the demodulated content, which the multiplexor 331 provides as part of the data 390.

Figure 4:
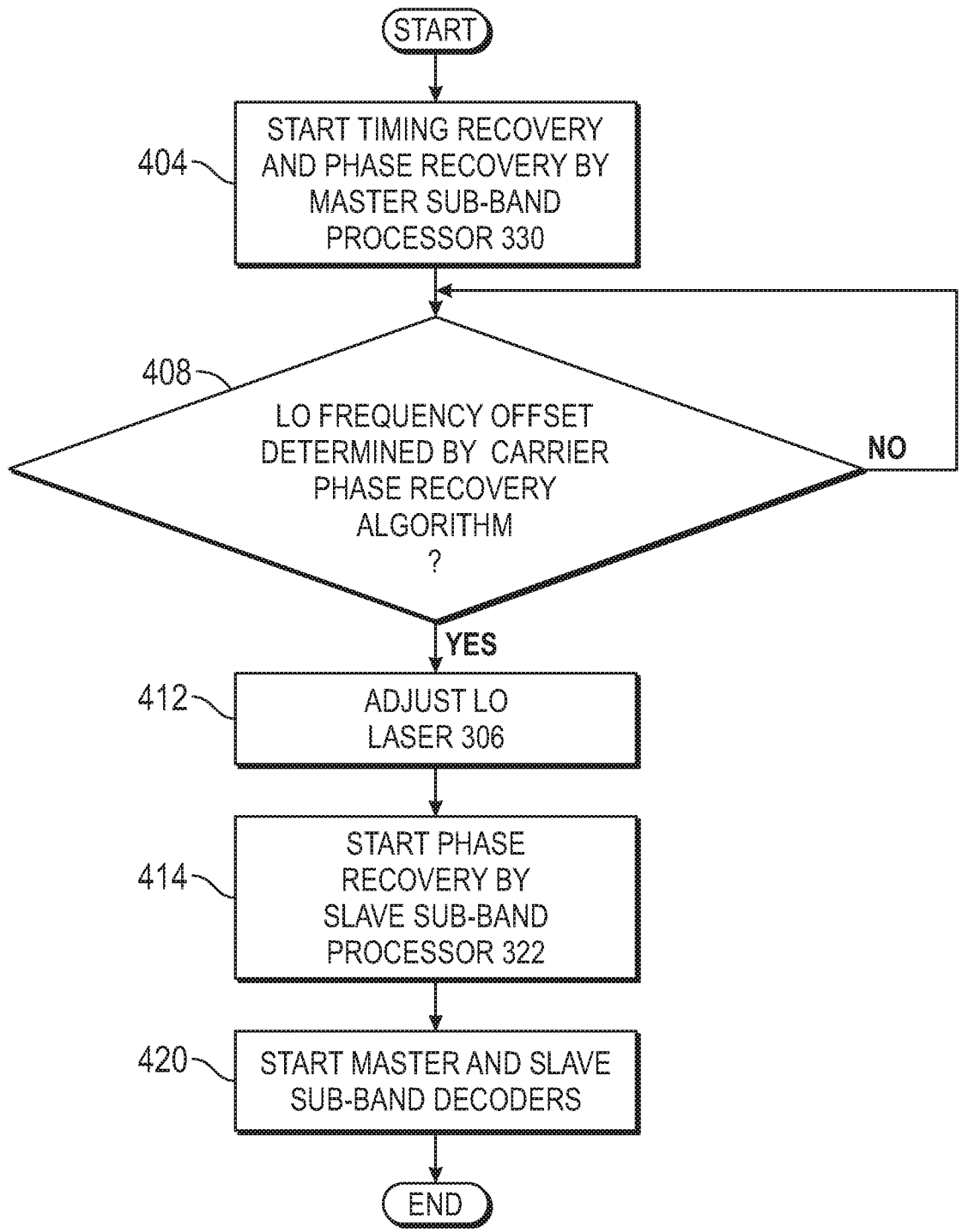
FIG. 4 is a flow diagram depicting a technique used by a hybrid digital multi-band receiver to start up the receiver according to an example implementation.

In accordance with example implementations, a controller 301 controls the start up of the receiver 300. More specifically, referring to FIG. 4 in conjunction with FIG. 3, in accordance with example implementations, the controller 301 performs a technique 400 during the initialization, or startup, of the receiver 300. Pursuant to the technique 400, the controller 301 initially starts up the master sub-band processor 330, pursuant to block 404, which allows the equalizer engine 334 to converge and the LOFO to be determined by the carrier phase recovery algorithm that is performed by the phase recovery engine 336. In response to determining that the equalizer engine 334 has converged and the LOFO has been determined (decision block 408), the master sub-band processor 330 adjusts (block 412) the LO laser 306. Next, the controller 301 starts (block 416) the phase recovery by the slave sub-band processor 332 (i.e., starts the phase recovery engines 326), pursuant to block 416. The technique 400 next includes the controller 301 starting (block 420) the master and slave band demapping and decoder engines 328 and 330.

Figure 5:
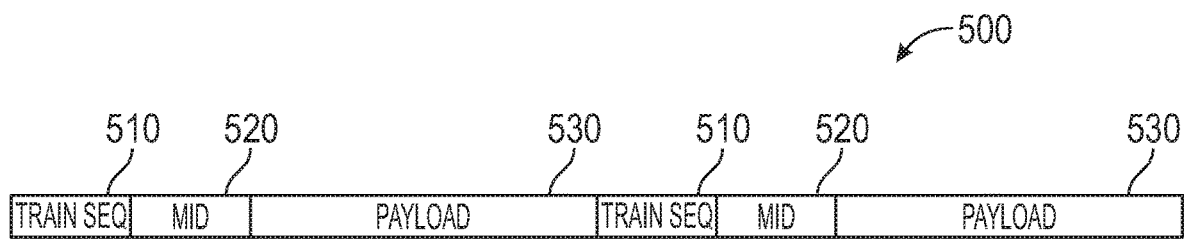
FIG. 5 is an illustration of a control string communicated over a master sub-band and containing modulation identifiers according to an example implementation.

Referring to FIG. 5, in accordance with example implementations, the control signal that is transmitted in the master sub-band may include a pre-defined modulation identification (MID) string 520, which represents a particular modulation format, or type, and a coding scheme to be used for both the master and slave sub-bands. As depicted in FIG. 5, for an example data sequence 500, the MID string 520 may be adjacent in time to a training sequence 510, which may be the same for all combinations of modulation format and coding schemes. The MID string 520 may be either before or after (as depicted in FIG. 5) the training sequence 510, which, in general, improves the robustness of detecting the string MID 520.

Moreover, as depicted in FIG. 5, in accordance with some implementations, the MID string 520 may repeat in a couple of frames to further improve its robustness. The repetition, as well as the frame length, may depend on the payload structure, such as FEC encoding and the client data.

The MDI string 520 allows different modulation formats and coding schemes to be communicated to the receiver 300. In this manner, as an example, in accordance with some implementations, the receiver 300 may be preset with a default modulation type (a QPSK or BPSK modulation type, for example) as a default such that upon the initialization of the receiver 300, the MID string 520 may be communicated to the receiver 300 to change the modulation format of the receiver 300 to another format. As such, in accordance with example implementations, it may unnecessary to preset the particular modulation format for the receiver 300.

Figure 6:
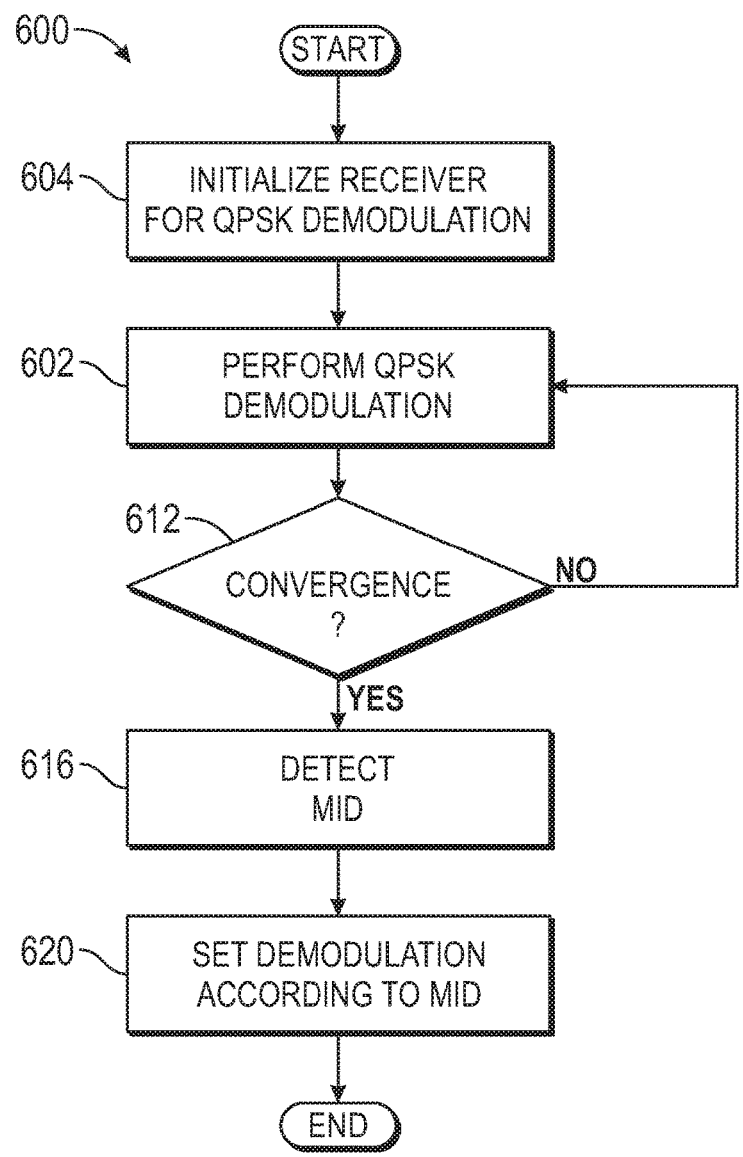
FIG. 6 is a flow diagram depicting a technique used by a hybrid digital multi-band receiver to set a modulation type for the receiver according to an example implementation.

Referring to FIG. 6 in conjunction with FIG. 3, in accordance with some implementations, the receiver 300 may perform a technique 600 for purposes of initializing the modulation format and coding scheme for the receiver 300. Pursuant to the technique 600, the master sub-band processor 330 is initialized (pursuant to block 604) a particular demodulation, such as here, QPSK modulation; and as such, the initial demodulation is applied using QPSK demodulation, as depicted in block 608. In response to the master sub-band processor 330 determining (decision block 612) that the equalizer 334 has converged, then the master sub-band processor 330 may, from the demodulated and decoded data, detect the string 520, as depicted in block 616 and set the demodulation and encoding for the master and slave sub-bands according to the demodulation format and encoding indicated by the string, pursuant to block 620.

While the present disclosure has been described with respect to a limited number of implementations, those skilled in the art, having the benefit of this disclosure, will appreciate numerous modifications and variations therefrom. It is intended that the appended claims cover all such modifications and variations

What is claimed is:

1. A method comprising:
generating control data of payload data, wherein the control data represents a feature associated with a master sub-band and a plurality of slave sub-bands;
distributing the payload data among the master sub-band and the plurality of slave sub-bands, wherein the master sub-band and the plurality of slave sub-bands to collectively extend over an allocated frequency spectrum, the master sub-band and the plurality of slave sub-bands to be associated with different carrier frequencies, the master sub-band having a center frequency to correspond to a center frequency of the allocated frequency spectrum, and distributing the payload data comprises designating the control data to be in the master sub-band;
generating modulated data for the master sub-band and the plurality of slave sub-bands based on the distributed payload data; and
transmitting an optical signal to an optical medium representing the modulated data.

2. The method of claim 1, wherein the control data comprises data to set a type of modulation associated with the master sub-band and the plurality of slave sub-bands.

3. The method of claim 2, wherein:
generating the data to control the type of modulation comprises generating first default data to set a default type of modulation associated with the master sub-band and the plurality of slave sub-bands and subsequently generating second data to set a different type of modulation associated with the master sub-band and the slave sub-bands.

4. The method of claim 1, wherein the first master sub-band is wider than each of the slave sub-bands.

5. The method of claim 1, wherein a first number of the slave sub-bands extend in the allocated frequency spectrum above the master sub-band, a second number of the slave sub-bands extend in the allocated frequency spectrum below the master sub-band, and the first and second numbers are equal.

6. An optical receiver apparatus comprising:
a tunable local oscillator (LO) laser;
a coherent optical receiver to be optically coupled to the LO laser, be optically coupled to an optical fiber to receive an optical signal from the optical fiber, and provide a second signal, wherein the optical signal comprises a master sub-band and a plurality of slave sub-bands, the master sub-band and the plurality of slave sub-bands to collectively extend over an allocated frequency spectrum, the master sub-band and the plurality of slave sub-bands are associated with different carrier frequencies, the master sub-band having a center frequency to correspond to a center frequency of the allocated frequency spectrum, and the master sub-band of the optical signal comprises payload control content representing a feature associated with the master sub-band of the optical signal and the plurality of slave sub-bands of the optical signal;
a first processor to:
 determine a phase adjustment for the LO laser based on information contained within the master sub-band of the optical signal to cause a plurality of slave sub-bands of the second signal provided by the coherent optical receiver to converge with the master sub-band of the optical signal; and
a second processor to:
 based on the phase adjustment determined from the information contained within the master sub-band of the optical signal and the payload control content, recover data from the plurality of slave sub-bands of the second signal.

7. The optical receiver apparatus of claim 6, further comprising:
an analog-to-digital converter (ADC) to provide a digital signal representing the second signal; and
a voltage controlled oscillator (VCO) to provide a clock signal to the ADC,
wherein the first processor controls the VCO based on the payload control content.

8. The optical receiver apparatus of claim 7, wherein the first processor controls the VCO based on a timing derived from symbols represented by the payload control content.

9. The optical receiver apparatus of claim 6, wherein:
the first processor comprises a demodulation demapper to perform modulation symbol demapping associated with symbols represented by the payload control content; and
the second processor comprises a plurality of demodulation mappers to demap modulation symbols associated with the slave sub-bands.

10. The optical receiver apparatus of claim 6, wherein:
the first processor comprises a decoder to decode data associated with the master sub-band of the optical signal; and
the second processor comprises a plurality of decoders to decode information associated with the slave sub-bands of the optical signal.

11. The optical receiver apparatus of claim 10, wherein the decoder of the first processor is jointly coupled to the plurality of decoders of the second processor.

12. The optical receiver apparatus of claim 6, further comprising:
a digital pre-processing engine to compensate for at least one of a time skew, a quadrature error, or a frequency offset associated with the master sub-band and the plurality of slave sub-bands of the optical signal.

13. The optical receiver apparatus of claim 6, wherein the first processor determines a type of demodulation of a plurality of types of demodulation based on the payload control content, and applies the determined type of demodulation to the master sub-band and the plurality of slave sub-bands of the optical signal.

14. The optical receiver apparatus of claim 6, wherein the first processor starts the second processor in response to the master sub-band of the second signal converging with the master sub-band of the optical signal.

15. The optical receiver apparatus of claim 6, wherein the master sub-band of the optical signal is associated with a wider frequency spectrum than a frequency spectrum associated with each of the slave sub-bands of the optical signal.

16. An optical transmitter apparatus comprising:
a first processor associated with a master sub-band to modulate a master carrier frequency associated with the master sub-band;
a second processor associated with a plurality of slave sub-bands to modulate slave carrier frequencies associated with the slave sub-bands with data, wherein the master sub-band and the plurality of slave sub-bands collectively extend over an allocated frequency spectrum, the master sub-band has a center frequency corresponding to a center frequency of the allocated frequency spectrum;
a demultiplexor to distribute payload data to the first processor and the second processor, wherein the payload data comprises control data representing a feature associated with the master sub-band and the plurality of slave sub-bands, and distributing the payload data comprises designating the control data to be in the master sub-band; and
a multiplexor to combine outputs of the first and second processors to provide an optical signal to an optical fiber representing the payload data.

17. The optical transmitter apparatus of claim 16, wherein the master sub-band is wider than each of the slave sub-bands.

18. The optical transmitter apparatus of claim 16, wherein:
the first processor comprises an encoder; and
the second processor comprises a plurality of encoders,
wherein the encoder of the first processor is jointly coupled to the plurality of encoders of the second processor.

19. The optical transmitter apparatus of claim 16, wherein the allocated frequency spectrum comprises nulls between a first slave sub-band of the plurality of slave sub-bands and a second null between a second slave sub-band of the plurality of slave sub-bands and the master sub-band.

* * * * *